(No Model.)

H. KRAMMER.
MANUFACTURE OF TRUNKS, HAT BOXES, &c.

No. 500,912. Patented July 4, 1893.

Witnesses
Percy C. Bowen
John L. Wilson

Inventor
H. Krammer
By Whitman & Wilkinson
Attorneys.

UNITED STATES PATENT OFFICE.

HERMANN KRAMMER, OF VIENNA, AUSTRIA-HUNGARY.

MANUFACTURE OF TRUNKS, HAT-BOXES, &c.

SPECIFICATION forming part of Letters Patent No. 500,912, dated July 4, 1893.

Application filed January 22, 1891. Serial No. 378,712. (No specimens.) Patented in Austria-Hungary November 4, 1888, No. 38 and No. 2,937; in Germany January 16, 1889, No. 48,035; in France February 2, 1889, No. 195,816; in England February 14, 1889, No. 2,661; in Belgium February 14, 1889, No. 85,011, and in Italy March 31, 1889, No. 24,997.

*To all whom it may concern:*

Be it known that I, HERMANN KRAMMER, a subject of the Emperor of Austria-Hungary, residing at Vienna, Austria-Hungary, have invented certain new and useful Improvements in the Manufacture of Trunks, Hat-Boxes, &c., (for which I have obtained Letters Patent in England, No. 2,661, dated February 14, 1889; in Belgium, No. 85,011, dated February 14, 1889; in France, No. 195,816, dated February 2, 1889; in Italy, No. 24,997, dated March 31, 1889; in Germany, No. 48,035, dated January 16, 1889, and in Austria-Hungary, No. 38 and No. 2,937, dated November 4, 1888;) and I do hereby declare the following to be a full, clear, and exact description of the invention, such as will enable others skilled in the art to which it appertains to make and use the same.

My present invention relates to trunks and hat boxes, and it consists in providing a cheap, light, and exceedingly strong and durable trunk or hat box, as will be hereinafter described.

Reference is had to the accompanying drawings, which illustrate a trunk manufactured according to the present invention, and in which the same parts are indicated by the same letters throughout the several views.

Figure 1:
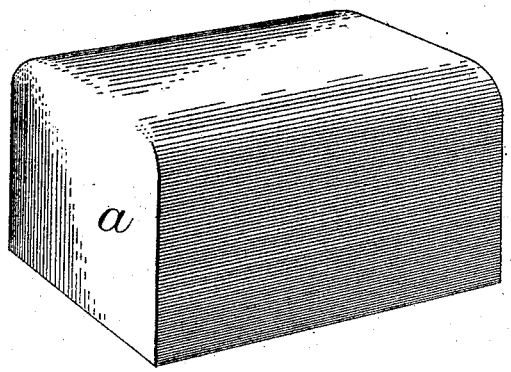
Figure 2:
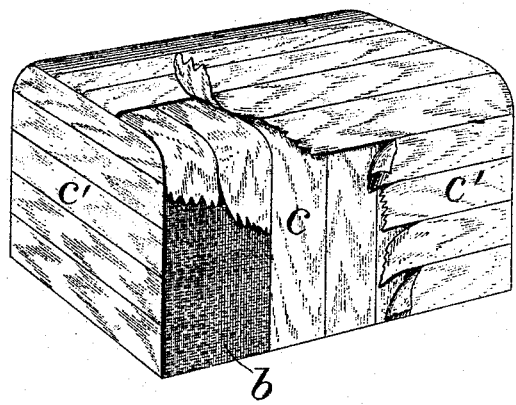
Figure 3:
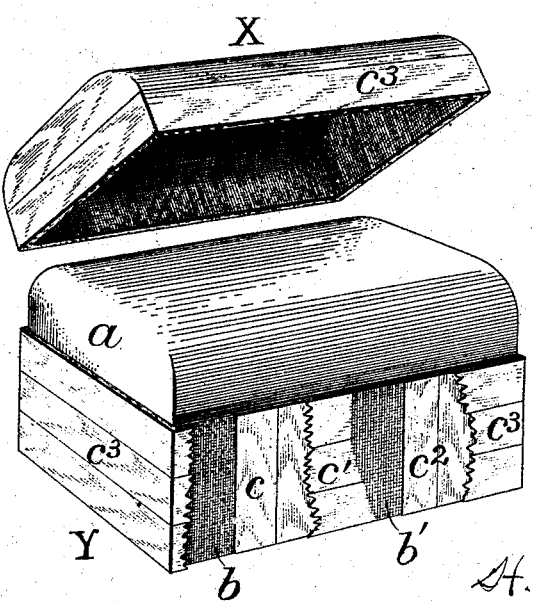

Figure 1 represents a perspective view of the mold or form on which the body of the trunk is manufactured, and Figs. 2 and 3 represent stages of the manufacture, which is as follows:

A woven fabric $b$, such as coarse linen, is stretched upon a suitable mold or form $a$; a layer of wood shavings, $c$, is then cemented upon the woven fabric $b$. After this operation a second layer of wood shavings $c'$ is cemented upon the first layer $c$, but transversely to the latter, as shown in Fig. 2. Another layer of woven fabric $b'$ is then glued on to form the fourth layer, as shown in Fig. 3, and upon this layer other layers of wood shavings $c^2$ and $c^3$ are cemented on so as to cross each other. In this manner further layers of linen and wood shavings can be applied until the required thickness is obtained. Finally the shell so formed is cut through as shown in Fig. 3, so as to constitute the top and bottom of the trunk, and the mold $a$ is taken out. The finished parts X and Y of the trunk, may be covered with leather or other suitable material, and the necessary hinges, locks, and other fittings are applied. By having the layers of wood shavings cross each other and then cementing them with the woven fabric, a solid mass of great stiffness is obtained, which is also possessed of great tensile strength; for the resistance of wood to extension or compression along the grain of the wood is very great, and no strain can be brought upon the trunk or hat box that is not resisted by some of these shavings, in their position of greatest resistance.

Since hat boxes and trunks, especially trunks, are frequently subjected to very hard usage, it is specially desirable to obtain a material which will be sufficiently light and yet sufficiently strong to withstand the ordinary strains to which such articles are subjected.

Having thus described my invention, what I claim, and desire to secure by Letters Patent of the United States, is—

A body for trunks or hat boxes, formed of a hollow shell cut through to form the top and bottom portions of the trunk body and consisting of an interior lining or backing of woven fabric, a layer of wood shavings cemented thereon, a second layer of wood shavings cemented transversely upon the first layer, a layer of woven material cemented over these two layers of wood shavings, then two more layers of wood shavings cemented on transversely to each other, and another layer of woven fabric, and so on up to the required thickness, substantially as and for the purposes described.

In testimony whereof I have affixed my signature in presence of two witnesses.

HERMANN KRAMMER.

Witnesses:
T. G. HARDY,
E. G. J. MOELLER.